United States Patent [19]

Ibrahim

[11] Patent Number: 4,478,051
[45] Date of Patent: Oct. 23, 1984

[54] ELECTRONIC TEMPERATURE CONTROL SYSTEM

[75] Inventor: Fayez F. Ibrahim, Niles, Mich.

[73] Assignee: Tyler Refrigeration Corporation, Niles, Mich.

[21] Appl. No.: 492,486

[22] Filed: May 6, 1983

[51] Int. Cl.³ ...................... F25B 41/00; G05D 23/00
[52] U.S. Cl. ...................................... 62/212; 62/211; 165/39; 236/91 F
[58] Field of Search ................. 62/211, 212, 223, 225; 236/91 F; 165/39

[56] References Cited

U.S. PATENT DOCUMENTS

| | | | |
|---|---|---|---|
| 2,579,034 | 12/1951 | Dube et al. | 62/211 |
| 3,577,743 | 5/1971 | Long | 62/204 |
| 3,803,865 | 4/1974 | Newton | 62/225 X |
| 4,067,203 | 1/1978 | Behr | 62/208 |
| 4,283,921 | 8/1981 | Prosky | 62/223 X |

Primary Examiner—William E. Wayner
Assistant Examiner—J. Sollecito
Attorney, Agent, or Firm—LeBlanc, Nolan, Shur & Nies

[57] ABSTRACT

A refrigeration system including a refrigeration control system for controlling the operation of the refrigeration system so as to insure that the temperature of the refrigerant discharged from the evaporator coil is above the saturation temperature. The refrigeration system includes at least one refrigerated display case having an evaporator within the primary air conduit and an expansion valve coupled to the inlet end of the evaporator coil. The control system includes: a pressure sensor arranged within the refrigerant discharge line, i.e. suction line to compressor, from the evaporator coil; a first temperature sensor arranged at the air discharge side of the evaporator coil for sensing the temperature ($T_1$) of the air that has passed over the evaporator coil, a second temperature sensor arranged adjacent to the refrigerant discharge end of the evaporator coil for measuring the temperature ($T_2$) of the refrigerant discharged from the evaporator coil and a third temperature sensor arranged adjacent the inlet end of the evaporator coil for sensing the temperature ($T_3$) of the refrigerant flowing into the evaporator coil. Based upon a comparison of temperatures $T_1$, $T_2$ and $T_3$ a series of output control signals are provided for controlling the operation of the expansion valve.

36 Claims, 6 Drawing Figures

ELECTRONIC TEMPERATURE CONTROL SYSTEM

BACKGROUND OF THE INVENTION

The present invention involves a refrigeration control system for controlling the operation of a refrigeration system in order to insure efficient operation of the system and that the refrigerant discharge from the evaporator is sufficiently superheated and above the saturation temperature so that it is completely converted into a gaseous state before being returned to the compressor.

In recent years, numerous technological advances have been made for optimizing the energy use of a refrigeration system by lowering the condensing temperatures and increasing the liquid subcooling such as disclosed in U.S. Pat. No. 4,286,437, entitled "Energy Saving Refrigeration System," and No. 4,304,100, entitled "Energy Saving Refrigeration System With Mechanical Subcooling." As a result of such advancements, the capacity of the compressors within the refrigeration systems have increased by as much as 40%. In addition, during mild load conditions that exist during the cold season, the load condition on the evaporator coil may drop by as much as 30%. Since the compressors are sized to handle operations at high load conditions, i.e. during the warmest time of the year, and the compressors may have a large excess of capacity under low load conditions. This often leads to a large fluctuation in the temperature of the display case. By improving the efficiency of operation of the system, the load is decreased and the size of the compressors can be decreased.

In order to help maintain proper operation of the evaporator coil and the compressors, it is mandatory that the refrigerant passing through the evaporator coil is fully converted into a gaseous state. If the refrigerant is not fully converted into a gaseous state, but remains at least partially liquified, this liquid when discharged into the compressor can result in severe damage to the compressor. In order to insure the complete conversion of the refrigerant from a liquid to a gaseous state within the evaporator, a sensing device has been placed at the outlet of the evaporator coil to maintain specific preset superheated conditions, normally from 3° to 10° F. This operation, however, is not based upon actual load conditions but only a comparison of the measured temperature with a preselected temperature. The comparison that is made then is used for controlling operation of the expansion valve so as to vary the flow of refrigerant into the evaporator in order to achieve the desired level of superheat as compared to the preset level of superheat.

Other types of controls have been employed for trying to avoid flooding of the compressor. One typical type of control that has been used includes a thermostat and liquid line solenoid which is connected to the input side of the evaporator coil. If the temperature measured by the thermostat arranged at the output side of the evaporator coil falls then the flow of liquid to the evaporator coil is turned off by control of the liquid line solenoid. This process will tend to result in pumping out the refrigerant from the evaporator coil when the solenoid blocks the flow of the refrigerant. When the temperature again rises, the solenoid valve is opened and the coil again will be flooded. This process often leads to high fluctuations in the temperature of the air passing over the evaporator coil.

Another type of control relies upon the use of evaporator pressure regulators. Such regulators are installed in the suction line of the compressor and are used to keep the suction pressure of the compressor constant all the time. Two problems with this type of regulator are: first, that it operates independently of the load conditions at the display case and therefore has a tendency to cause the display case to run several degrees colder in the mild seasons and several degrees warmer in the colder seasons and second, that in order for the evaporator pressure regulator to keep the same suction pressure at the evaporator coil it has to modulate between open and closed positions which creates a pressure drop typically of 3-7 psi. Typically every pressure drop of 2 psi in the system leads to a 5% greater consumption of energy by the compressor.

A third type of control system that has been utilized is a temperature pressure regulator. The problem incurred with the use of such a temperature pressure regulator relates to the pressure drop that is incurred during operation of the controls which results in increasing the energy consumption.

In order to improve the efficiency of operation of the refrigeration system, several different types of electronic control systems have been developed. In several of these systems, an electronically controlled expansion valve is utilized such as shown in U.S. Pat. No. 3,872,685 to Matthis. In such patent, the temperature at the outlet of the refrigeration air conduit is measured and such temperature is compared with a preselected temperature for then controlling the operation of the expansion valve. An expansion valve of the type shown in this patent is currently marketed by Singer Controls Company of America under the name Thermal-Electric Expansion Valve (R-205); in a brochure describing such expansion valve a temperature sensor, a thermistor, is shown inserted into the discharge line of the evaporator for providing a feedback signal for controlling operation of the Thermal Electric Expansion Valve.

Two other electronic control systems for refrigeration systems are disclosed in U.S. Pat. Nos. 4,102,150 and 4,112,703 to Kountz. Both of these patents disclose systems for controlling an air conditioning refrigeration system used in an automobile.

In the first of the patents to Kountz, the temperature along the discharge line from the evaporator coil is measured and the temperature within the actual space being air conditioned is measured and each of these temperatures is compared to a set temperature and in response to such comparison output signals are provided for controlling the operation of a solenoid operated control valve located in a by-pass line around the compressor for controlling the crank case pressure within the compressor. The first temperature sensor located in the space being air conditioned provides a space temperature signal that represents the actual ambient temperature. A circuit then provides a temperature set point signal representing the desired temperature for the space being air conditioned. A comparator responds to the space temperature signal and the temperature set point signal to produce a temperature control point signal which represents a desired evaporator refrigerant outlet temperature. The second temperature sensor positioned adjacent to the discharge line from the evaporator provides an evaporator outlet temperature signal representing the actual temperature of the refrigerant in such discharge line. An error signal is then provided, which error signal is responsive to the temperature control point signal and the evaporator outlet temperature signal. This error signal in turn is used for controlling the solenoid associated with the compressor for increasing the crankcase pressure of the compressor.

In the second of the two patents to Kountz, the temperature along the discharge line of the evaporator as well as the temperature within the actual space being air conditioned again are both measured. The processing of the temperature signals is similar to the processing in the above-noted first patent to Kountz. In the operation of the control system disclosed in this second patent to Kountz the objective is to maintain a substantially constant desired temperature in the space being air conditioned. The control system monitors both the ambient temperature in the space being air conditioned as well as the temperature of the refrigerant at the discharge line of the evaporator. An electromechanically controlled valve is included in series with the refrigeration circuit between the condenser and the evaporator and serves to control the flow of refrigerant through the evaporator. The control circuit responds to both of the temperature monitors for varying the actuation of the electromechanical valve to modulate the flow of refrigerant through the evaporator to adjust the refrigerant temperature at the evaporator outlet as required to maintain the controlled space at the desired temperature.

U.S. Pat. No. 3,807,192 to Porter describes a flow control system for varying the capacity of the refrigeration system. U.S. Pat. No. 4,129,995 to Usami discloses a refrigeration control system for controlling an expansion valve in response to the temperature and pressure of the refrigerant discharged out of the evaporator.

SUMMARY OF THE INVENTION

An object of the present invention is to provide a refrigeration system with an improved refrigeration control system for more efficiently operating the refrigeration system.

Another object of the present invention is to provide a refrigeration control system for efficiently operating the refrigeration system and maintaining the temperature level of the air discharged from the primary air conduit within the refrigeration system.

A further object of the present invention is to provide a refrigeration control system that maintains the temperature of the refrigerant discharged from the evaporator coil at a temperature above the saturation temperature of such refrigerant with this desired temperature level varying with variations in the refrigeration load.

A still further object of the present invention is to provide an improved refrigeration control system in which the temperature of the air discharged from the primary air conduit is maintained at a set temperature differential above the temperature of the refrigerant discharged from the evaporator coil arranged within the primary air conduit.

Still another object of the present invention is to provide an improved refrigeration control system in which the temperature of the refrigerant discharged from the evaporator coil is maintained at a temperature greater than the temperature of the refrigerant entering the evaporator coil so that such refrigerant is superheated by an amount sufficient to insure that all of the liquid refrigerant passing through the evaporator coil is completely transformed into a gaseous refrigerant by the time it is discharged from the evaporator coil.

These objectives are achieved by the refrigeration control system utilized within a refrigeration system in accordance with the present invention. The refrigeration system in which such control system is preferably utilized includes at least one refrigerated display case having an evaporator within a primary air conduit and an expansion valve coupled to the inlet end of the evaporator coil for supplying a refrigerant to the evaporator. The discharge line from the evaporator is then coupled back to a compressor within the refrigeration system.

During the operation of the evaporator coil, the load on the refrigeration system will vary due to varying conditions, e.g. temperature in the store and weather conditions (e.g. winter or summer season). These variations will effect the temperature ($T_3$) of the refrigerant entering the evaporator coil and the pressure (P) of the refrigerant discharged from the coil. In order to optimize the efficiency of the operation, the temperature ($T_2$) of the discharged refrigerant should be maintained at a set temperature differential ($T_D$) above the saturation temperature ($T_{sat}$) of the discharged refrigerant. This will insure that temperature $T_2$ contains superheat and that $T_2 > T_3$. The level of superheat in the discharged refrigerant is equal to this described temperature differential ($T_D$). By measuring the pressure of the discharged refrigerant (P), the saturation temperature ($T_{sat}$) can be determined since $P = T_{sat}$. This saturation temperature is used to set the desired temperature level ($T_{2set}$) for the temperature $T_2$ of the discharged refrigerant by adding to the saturation temperature ($T_{sat}$) the desired superheat temperature ($T_{sh}$). Thus, $T_{2set} = T_{sat} + T_{sh}$.

The control system includes a first temperature sensing mechanism that is arranged at the air discharge side of the evaporator coil for sensing the temperature ($T_1$) of the air that has passed over the evaporator coil. A second temperature sensing mechanism is arranged adjacent to the refrigerant discharge line of the evaporator coil for measuring the temperature ($T_2$) of the refrigerant leaving the evaporator coil. A pressure sensor measures the pressure (P) of the refrigerant in the discharge line of the evaporator.

A comparator compares temperature $T_1$ with temperature $T_2$ for determining if temperature $T_1$ is greater than temperature $T_2$ by a preselected temperature differential. This desired minimum temperature differential between $T_1$ and $T_2$ is set by a control circuit within the refrigeration control system. By maintaining temperature $T_1$ sufficiently above $T_2$, it is assured that the refrigerant discharged from the evaporator coil is above the saturation temperature of such refrigerant. The control circuit within the control system provides an output control signal for controlling the operation of the refrigeration system for maintaining temperature $T_1$ sufficiently above temperature $T_2$ by at least the set temperature differential.

In accordance with the present invention it also is desirable to maintain a set temperature differential between the temperature of the refrigerant entering the evaporator coil and the temperature of the refrigerant leaving the evaporator coil. This set temperature differential insures that the temperature of the discharged refrigerant is superheated, i.e. the temperature of the refrigerant is above the refrigerant's saturation temperature. By maintaining the temperature of the refrigerant discharged from the evaporator coil above the temperature of the refrigerant entering the evaporator coil by a preselected temperature differential, it can be assured that the refrigerant has been completely transformed from a liquid to a gaseous state. If the refrigerant leaving the evaporator coil is even partially in a liquid state, such liquid refrigerant can seriously damage the compressors to which the discharged refrigerant is fed. Consequently, a further sensing mechanism is arranged adjacent the inlet end of the evaporator coil for sensing the temperature ($T_3$) of the refrigerant flowing into the evaporator coil and the control circuit provides an output signal for controlling the operation of the refrigeration system for maintaining temperature $T_2$ greater than temperature $T_3$ with such temperature differential being an amount sufficient to insure that all of the liquid refrigerant passing through the evaporator coil is completely transformed into a gaseous refrigerant by the time such refrigerant is discharged from the evaporator coil.

In accordance with the preferred embodiments, temperature $T_1$ should be maintained a minimum of approximately 5° above temperature $T_2$. For a freezer display case, the temperature differential between $T_1$ and $T_2$ should be a minimum of at least 4° to 6° F. For medium temperature display cases, the minimum temperature differential between $T_1$ and $T_2$ should be at least 5° to 8° F.

In accordance with the present invention the control system can be set to control any one or more of the following three relationships, which were discussed above: (a) $T_2 > T_{2set} = T_{sat} + T_{sh}$; (b) $T_1 > T_2$; and, (c) $T_2 > T_3$.

In addition, the temperature of the air that has passed over the evaporator coil ($T_1$) should be maintained within 1° of a preset temperature ($T_{1set}$). For this purpose, the control circuit compares temperature $T_1$ with temperature $T_{1set}$ and if $(T_1 - T_{1set}) > 1°$ F. then an output signal is supplied for opening the expansion valve coupled to the inlet end of the evaporator coil and if $(T_1 - T_{1set}) < 1°$ F. then an output signal is supplied for closing the expansion valve. Thus, if the temperature $T_1$ exceeds the desired level additional refrigerant is supplied to the evaporator coil for providing additional cooling capacity.

It should be noted that all of the above-described temperature comparisons for generating control signals can be made time dependent. For example, an output control signal only would be generated if $(T_1 - T_{set}) > 1°$ F. for a time period in excess of 2 minutes. The time periods can be selectively varied for each of the different temperature comparisons.

A central computer can be connected to individual temperature controllers for each of the display cases within a system or series of display cases within the system so that the central computer can communicate with the individual controllers and set the desired temperatures and temperature differentials for each of the medium temperature display cases and the freezer display cases. The particular temperatures and temperature differentials which are set can vary and normally would vary with the time of day of operation. The time variance in the temperature can be made independent of the central computer. For example, during the nighttime hours when the store in which the display cases are located are closed it is often possible to run the display cases at a slightly higher temperature since the ambient air in the area outside of the display cases is normally lower during such nighttime hours due to both natural weather conditions and the absence of people and activities within the store. Consequently, the central computer enables the operations of all of the display cases and the refrigeration control systems for each of the display cases to be individually or in groups set for operations under different store conditions and for conditions occurring during different times of the day.

Additional operations that can be incorporated into the operation of the refrigeration control system in accordance with the preferred embodiment include an alarm system and a defrost control system. From the central computer, an alarm temperature ($T_A$) can be set. The control system then provides an output alarm signal if $T_1 > T_A$ and if such condition continues longer than a preselected time period; this time period normally would be the length of the defrost time period which then prevents this alarm from being set off during the defrost cycle. In addition, the control system can be coupled to a defrost clock for enabling periodic defrost operations of the display case. At set time intervals, a control signal is provided for closing the expansion valve and preventing the flow of refrigerant into the evaporators during the time period when a defrost operation is to occur.

DESCRIPTION OF THE PREFERRED EMBODIMENTS

Figure 1:
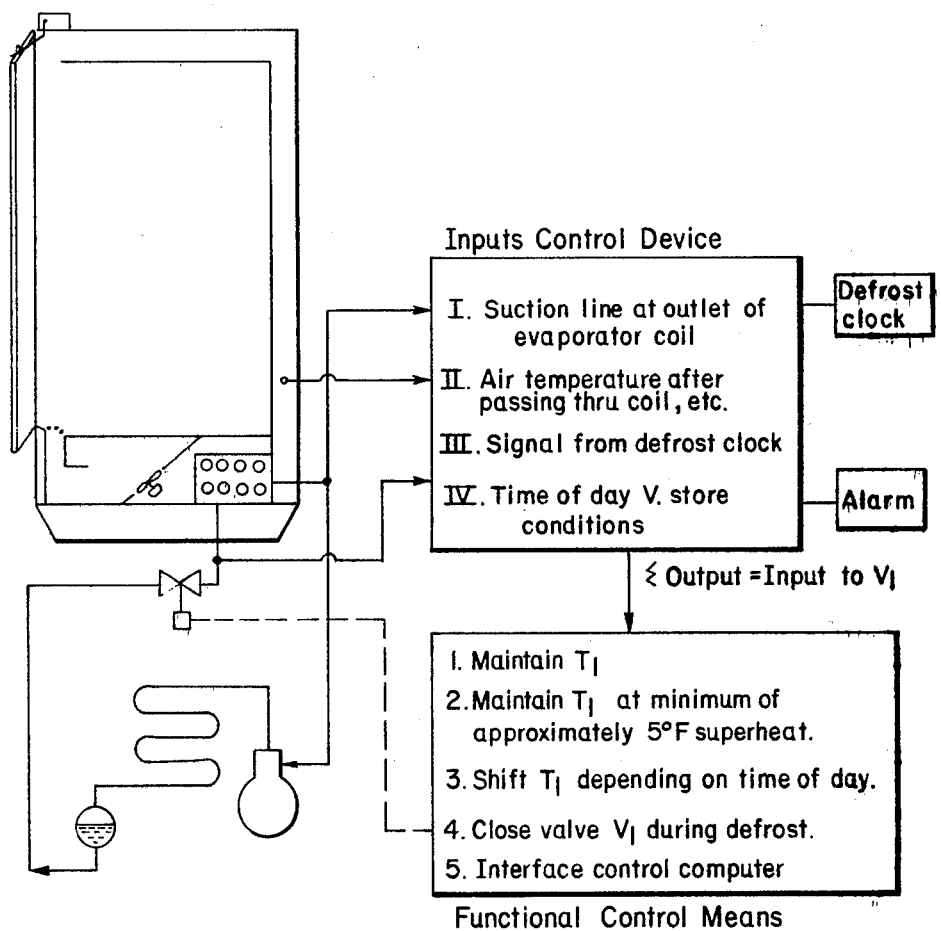
FIG. 1 is a block circuit representational diagram illustrating a refrigeration system in accordance with the present invention.

A refrigeration system in accordance with the present invention such as shown by the representational diagram in FIG. 1 includes a display case 2 having a primary air conduit 28 in which an evaporator coil 4 is arranged. The evaporator coil is provided with a refrigerant that passes through an electronically controlled expansion valve 6 into the evaporator via an input line 14. As the refrigerant passes through evaporator coil 4 it extracts heat from the air circulated over the evaporator coil and through the primary air conduit. By the time the refrigerant leaves evaporator coil 4 through discharge line 16 the refrigerant has been completely converted to a gaseous state and has a temperature ($T_2$) which is above the saturation temperature ($T_{sat}$) of the refrigerant; this saturation temperature varies with the pressure (P) of the refrigerant within the discharge line 16. This gaseous refrigerant then is returned to a compressor 8 where the gas is compressed and subsequently fed to a condenser 10. The gaseous refrigerant is transformed back into a liquid state and supplied to a receiver 12. The liquid refrigerant is then drawn out of receiver 12 and supplied to the expansion valve 6 for again being circulated through the evaporator coil 4.

By controlling the relationship between the various temperatures within the system, such as explained further below, a series of control signals can be generated for controlling the operation of electronic expansion valve 6. By modulating the flow of refrigerant through expansion valve 6 into evaporator coil 4, the various temperatures can be controlled and the efficiency of operation of the refrigeration system significantly improved while still insuring that the refrigerant has been completely converted into a gaseous state before being returned to the compressor. Arranged within primary air conduit 28 is a first temperature sensor for sensing the temperature of the air ($T_1$) that has passed over evaporator coil 4. At location 20 along discharge line 16 there is located both a temperature sensor for sensing the temperature ($T_2$) of the refrigerant passing through the discharge line and a pressure sensor for sensing the pressure (P) of the refrigerant within the discharge line. Finally, a third temperature sensor is arranged at point 22 along inlet line 14 for sensing the temperature ($T_3$) of the refrigerant flowing into evaporator coil 4.

The temperatures $T_1$, $T_2$, and $T_3$ as well as the pressure P are all supplied to input control device 24. Input control device 24 carries out a series of calculations based upon both the various temperature and pressure measurements as well as possibly additional information that can be fed to this control device from the operating conditions within the store in which the refrigeration system is located. This input control device can be a microcomputer system which would be supplied with information regarding the temperature within the store, the time of day, the temperature outside of the store, and other information which would effect the load conditions on the refrigeration system during its operation. In addition, control signals can be supplied to this input control device from a defrost clock 44 for providing control signals to control device 24 whenever a defrost operation is to take place. An output signal from control device 24 is connected to an alarm circuit 46 for providing an alarm signal when the temperature of the air ($T_1$) passing through primary air conduit 28 exceeds a preselected alarm temperature for a preselected period of time which is indicative of a loss of refrigeration within the display case.

The information from control device 24 is processed by a functional control means 26 for providing control signals which are supplied to electronically controlled expansion valve 6. The operations of inputs control device 24 and functional control means 26 can be carried out within a microcomputer.

Inputs control device 24, as shown in FIG. 1, receives the various temperature and pressure measurements including the temperature and pressure of the refrigerant within the suction line, i.e. discharge line, at the outlet of the evaporator coil, the temperature of the air that has passed over the evaporator coil and the temperature of the refrigerant entering at the inlet of the evaporator coil. In addition, signals are received from the defrost clock and information is supplied to the inputs control device indicative of the time of day and ambient store conditions. The functional control means 26 provides output signals for: maintaining temperature $T_1$; maintaining temperature $T_2$ at a minimum of approximately 5° superheat; shifting the temperature $T_1$ depending on the time of day, i.e. during nighttime operations when the store is closed temperature $T_1$ can be lowered; closing valve $V_1$ (electronically controlled expansion valve 6) during a defrost operation; and interfacing with a master control computer so that all of the display cases can be controlled from a central location within the store.

A primary control aspect of the refrigeration control system of the present invention is to maintain the temperature of the refrigerant within discharge line 16 above the saturation temperature of the refrigerant within such line. During operation of the refrigeration system, evaporator coil 4 is subjected to different operating conditions and the temperature of the refrigerant in inlet line 14 can vary. As the temperature of the refrigerant flowing into the evaporator coil varies the temperature of the refrigerant exiting from the evaporator coil also should be allowed to vary while still being maintained above the saturation temperature of the refrigerant. The saturation temperature of the refrigerant discharged from the evaporator coil is proportional to the pressure of such refrigerant within the discharge line. The relationship between the pressure (P) and the temperature ($T_2$) of the refrigerant in the discharge line is as follows:

For refrigerant R-502  Temperature Range −50 to 0° F.
$T_{sat} = 0.00053204591P^3 − 0.07027440492P^2 + 4.2630221429P − 98.92133288$
Temperature Range 0° F. to 50° F.
$T_{sat} = 0.0000031298402P^3 − 0.01112645218P^2 + 1.8907849084P − 66.2388444$
For refrigerant R-12  Temperature Range −10 to +50° F.
$T = 0.00025752709P^3 − 0.04544987P^2 + 3.7152263P − 66.375648$
For refrigerant R-22  Temperature Range −10 to +50° F.
$T = 0.00006161138P^3 − 0.017536207P^2 + 2.3158884P − 67.003218$ Consequently, by measuring the pressure of the refrigerant in discharge line 16 the saturation temperature of such refrigerant can be calculated. It is necessary that temperature $T_2$ of the discharged refrigerant always be maintained above the saturation temperature $T_{sat}$ by a desired temperature differential. This temperature differential is in the form of superheat ($T_{sh}$) which will exist within the discharged refrigerant. Consequently, the temperature of the refrigerant in the discharge line should be maintained in accordance with the following equation:

$$T_{2set} = T_{sat} + T_{sh}$$

$$T_2 \geq T_{2set}$$

Figure 2:
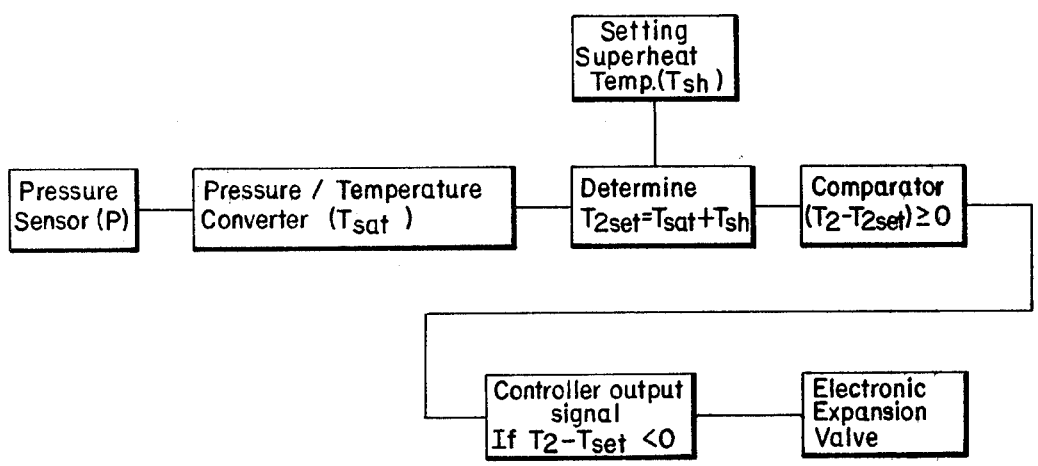
FIG. 2 is a block diagram of a portion of the refrigeration control system of the present invention.

In order to determine the set temperature for the discharged refrigerant ($T_{2set}$) and to maintain the temperature of such refrigerant above such set temperature, a circuit such as represented by the block diagram in FIG. 2 or a microcomputer can be used for such purposes. First, the pressure in the discharge line 16 is sensed by a pressure sensor 30. The pressure (P) is then converted into the saturation temperature ($T_{sat}$) by the use of the above-noted equation or by the use of a series of tables that can be stored within the microcomputer which provides a correlation between the pressure and the saturation temperature. This conversion is carried out by a converter 32. The desired amount of superheat to be present is set such as represented by block 36. Next, the desired setting for the discharged temperature ($T_{2set}$) is determined within block 34 by adding together the saturation temperature and the superheat temperature. A comparator 38 then compares the actual temperature of the discharged refrigerant with the set temperature to see if this differential is above or equal to 0 since the actual temperature always should be maintained equal to or greater than the set temperature. If temperature $T_2$ is less than the temperature $T_{2set}$ then a controller 40 provides an output signal which in turn is supplied to an electronic expansion valve 42. This electronic expansion valve as shown in FIG. 2 could be the valve 6 shown in the diagram in FIG. 1.

Figure 3:
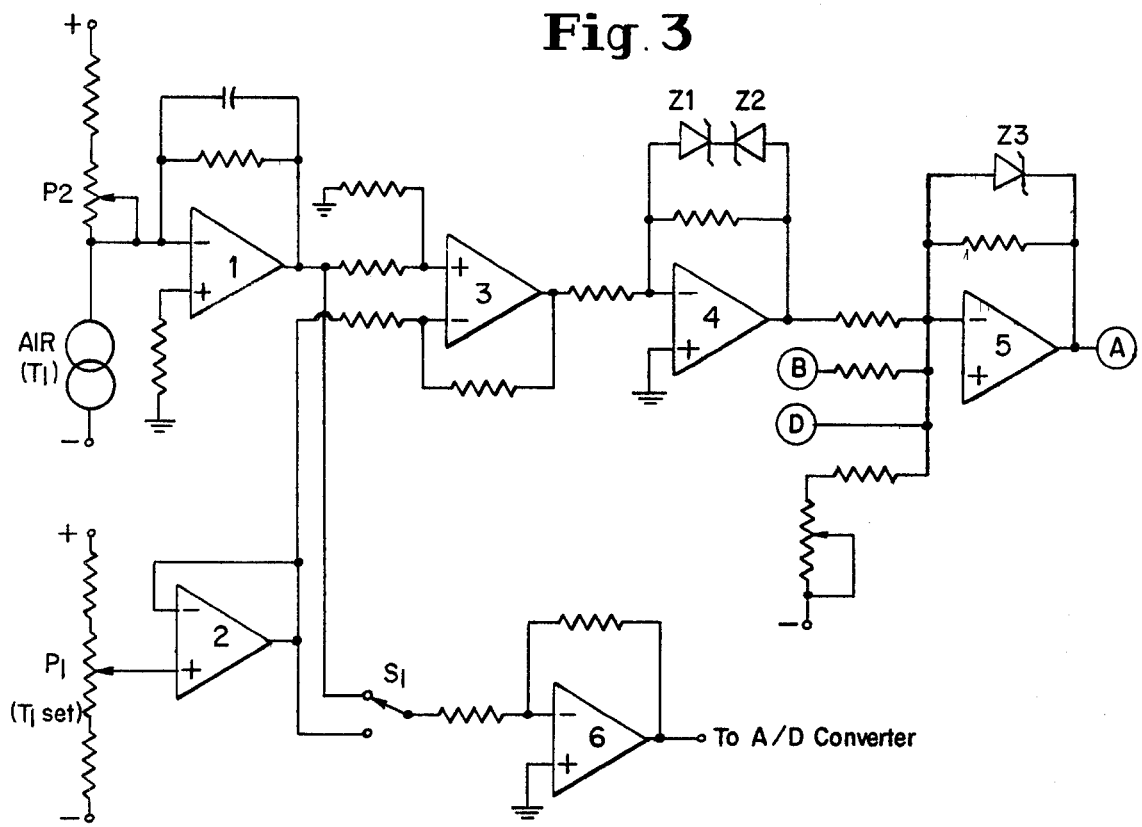
FIGS. 3-6 are schematic circuit diagrams of a preferred embodiment of control circuits for use in the refrigeration control system of the present invention.
Figure 4:
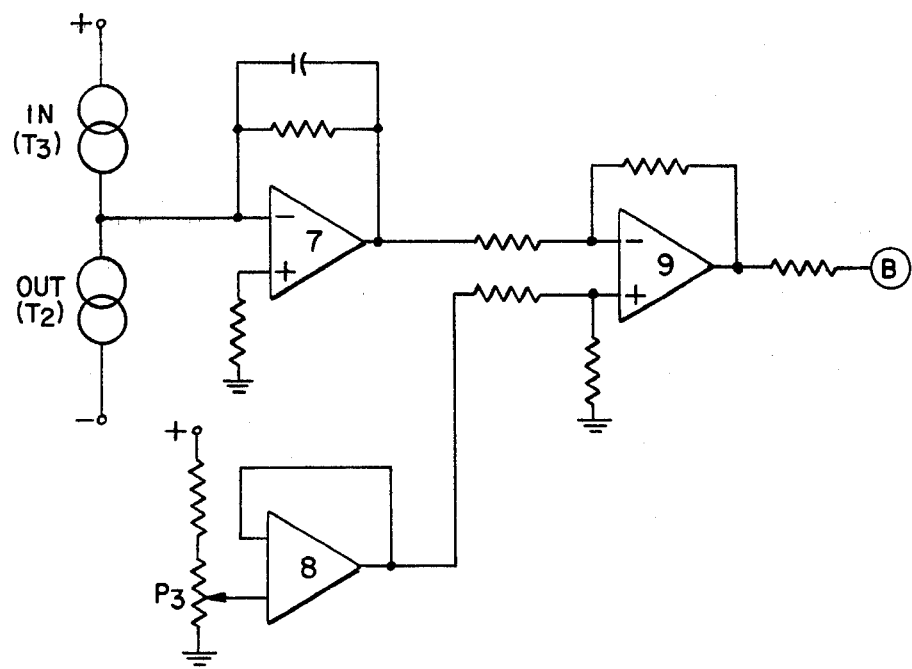
Figure 5:
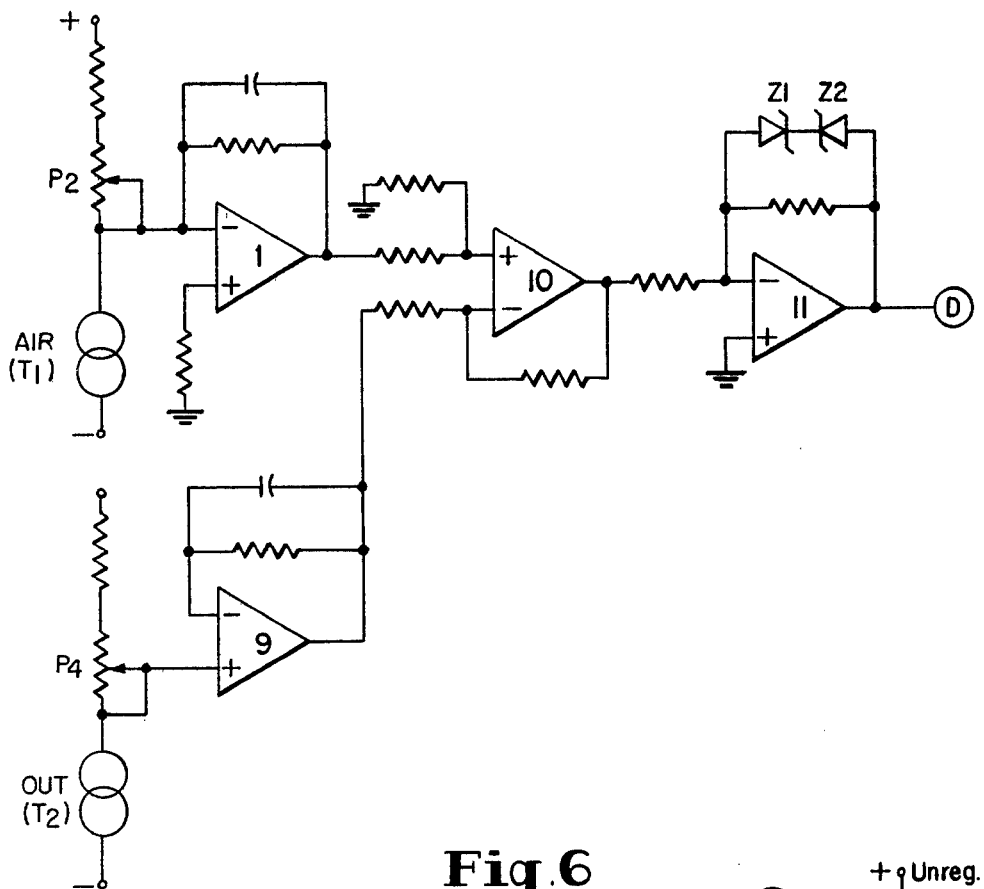
Figure 6:
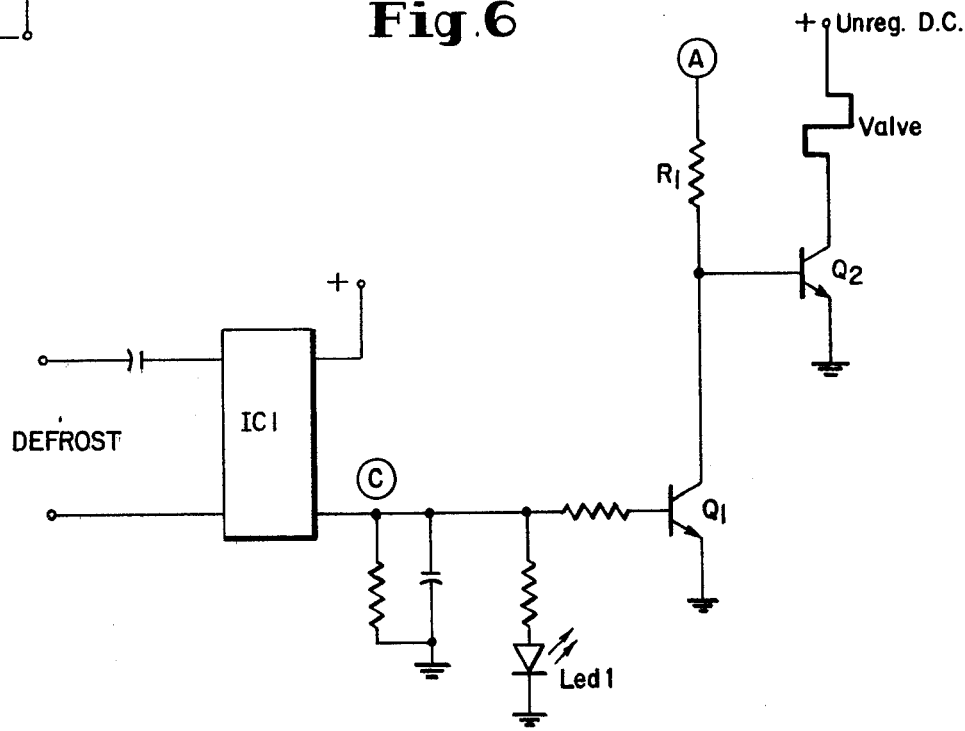
Figure 1:
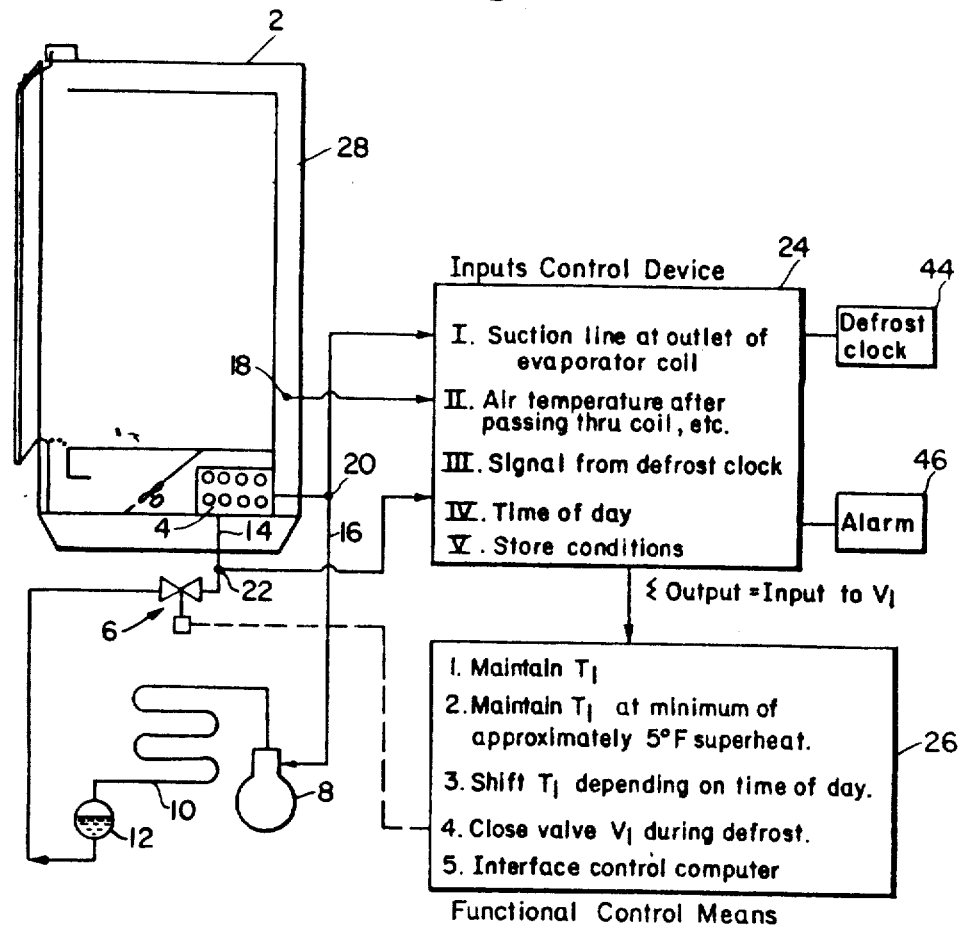
Figure 2:
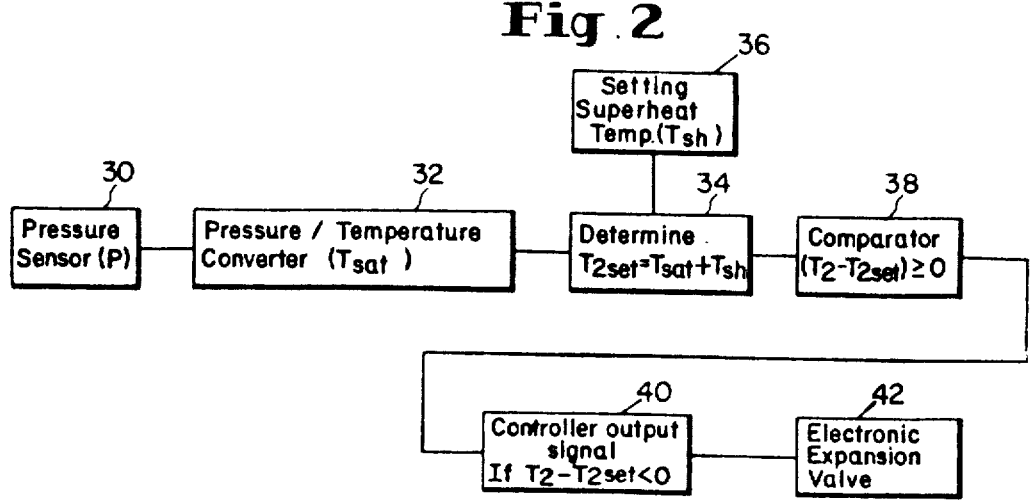
Figure 3:
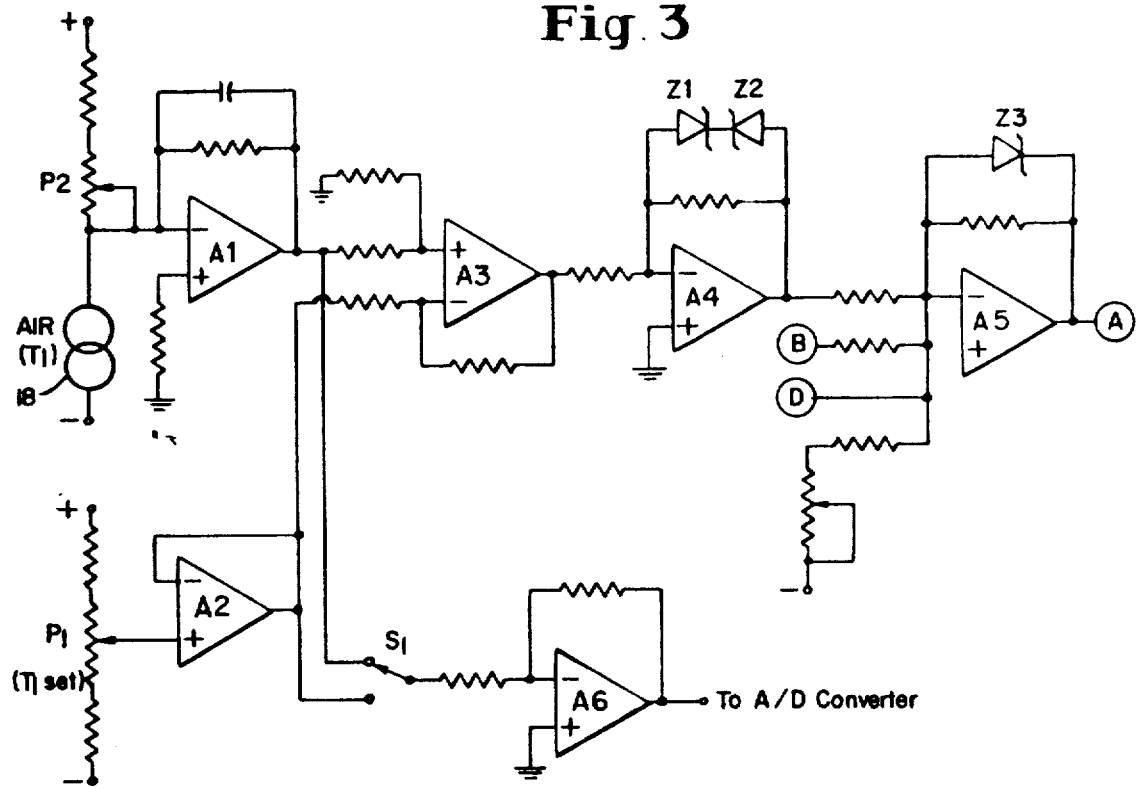
Figure 4:
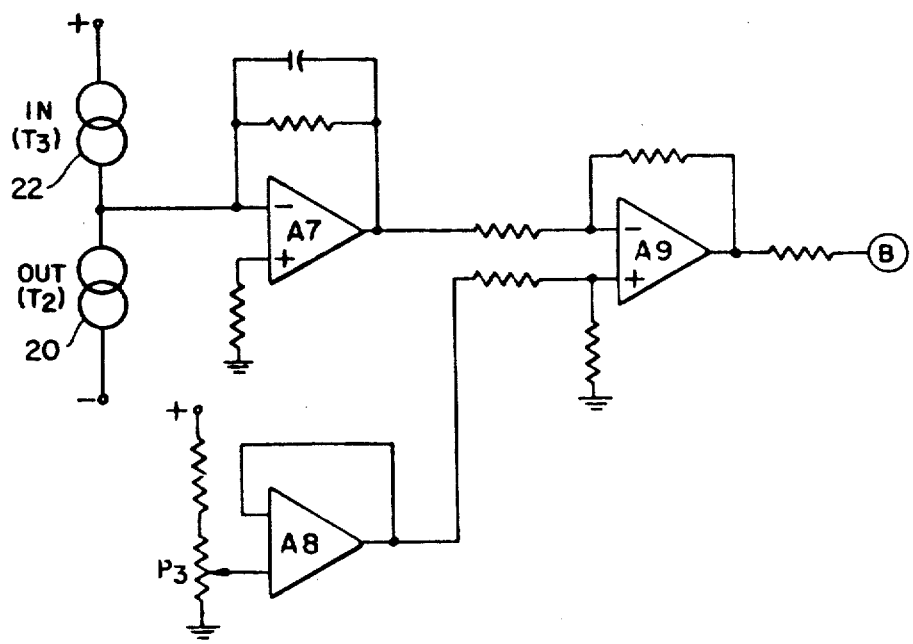
Figure 5:
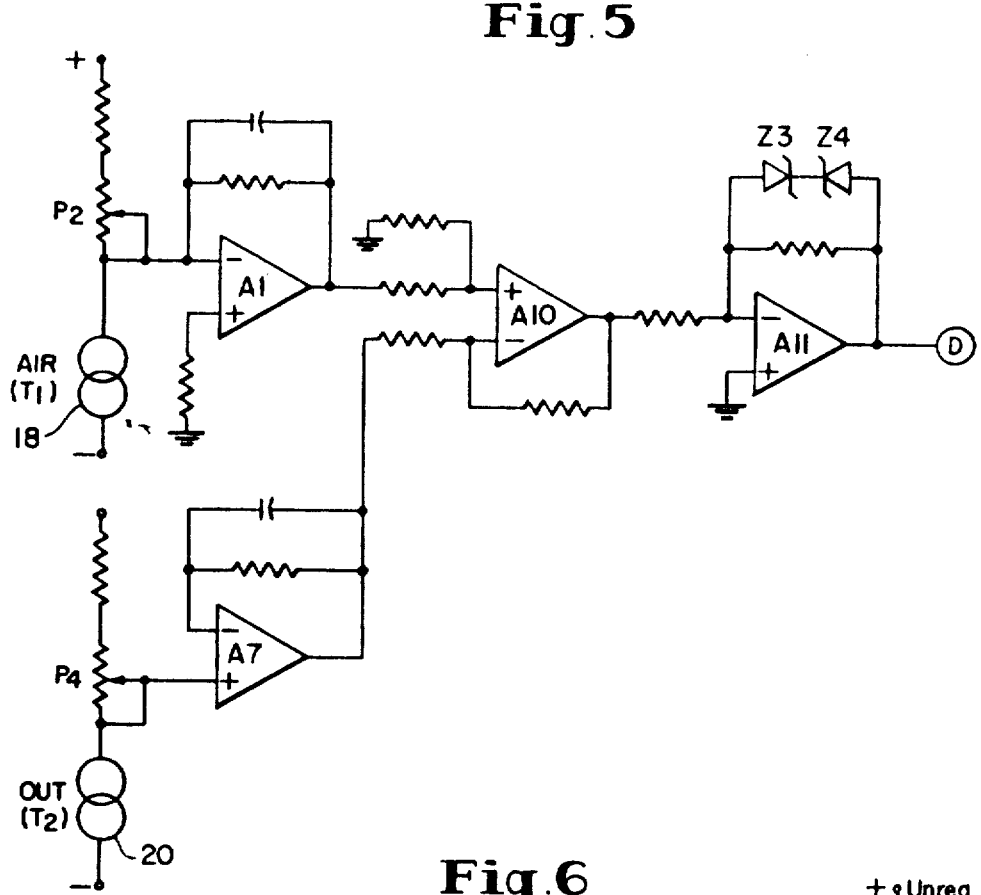
Figure 6:
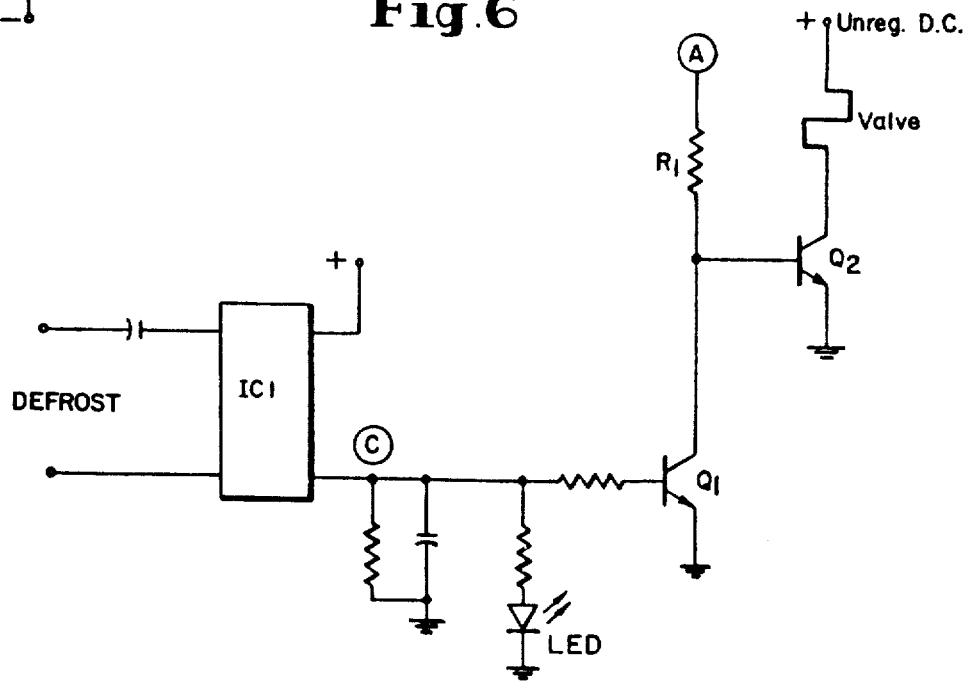

Exemplary circuit diagrams that can be used in accordance with the present invention for comparing temperatures $T_1$, $T_2$ and $T_3$ are shown in FIGS. 3, 4 and 5. As shown in FIG. 3, the temperature of the air flowing through the primary air conduit after it has passed over the evaporator coil is measured by sensor 18; this sensor provides an output signal indicative of temperature $T_1$. A preset temperature level $T_{1set}$ is set by the potentiometer P1. The signal from temperature sensor 18 is supplied to amplifier A1 which converts the temperature signal to an analog signal that is proportional to the temperature. The temperature value $T_{1set}$ is provided by potentiometer P1 in conjunction with the buffer amplifier A2. This set point may be read directly from an analog to digital converter by pressing switch S1 so that the temperature's $T_{1set}$ value is supplied through amplifier A6 to a digital output display. An error amplifier A3 produces a ± voltage signal representative of the difference between the set point temperature $T_{1set}$ and the measured temperature $T_1$. The temperature difference between $T_{1set}$ and $T_1$ should be maintained at ±1° F. This error signal then is amplified by amplifier A4, the output of which is clamped by zener diodes Z1 and Z2. Amplifier A5 provides for the summation of the amplified voltage of the error signal from amplifier A4 along with the amplified error signal from amplifier A9, called signal B, and the amplified error signal from amplifier A12, called signal D, so as to produce an output control signal A.

In the circuit shown in FIG. 4, both temperature sensor 18 and temperature sensor 22 are supplied to the same input line of amplifier A7. Temperature sensors 18 and 22 are connected in such a manner so that the signal supplied to amplifier A7 is a differential voltage between the voltage output signals from these two temperature sensors. By adjusting potentiometer P3, the buffer amplifier A8 is able to set the degree of superheat desired within the refrigerant discharged from the evaporator coil. An error amplifier A9 then produces a ± voltage between the superheat setting from the output of amplifier A8 and the output of amplifier A7; the output from error amplifier A9 is called signal B which is one of the inputs to amplifier A5 as referred to above in conjunction with FIG. 3.

In the circuit illustrated in FIG. 5, input signals are supplied by temperature sensors 18 and 20. As previously discussed, the voltage signal generated by temperature sensor 18, which is representative of the air temperature $T_1$, is supplied to amplifier A1 to provide an output signal and the voltage signal generated by temperature sensor 20, which is representative of the temperature of the discharged refrigerant $T_2$, is supplied to amplifier A7 to provide an output signal. These two output signals are then fed to amplifier A10 so as to provide an output signal indicative of the differential between temperatures $T_1$ and $T_2$. This output signal is then amplified by amplifier A11, the output of which is clamped by zener diodes Z3 and Z4. The output signal from amplifier A11 is called signal D, which as discussed above is supplied to summing amplifier A5.

During a defrost cycle of operation, a defrosting signal can be supplied to an integrated circuit IC1 which converts the defrost signal to a D.C. voltage signal C, the occurrence of which can be indicated by an LED 1. This signal C is supplied to transistor Q1 for turning on such transistor. The output of transistor Q1 is connected to the base of transistor Q2. When Q1 is turned on, this shunts the base of transistor Q2 thereby grounding transistor Q2. Coupled to the other end of the base of transistor Q2 is the output signal from summing amplifier A5 so that transistor Q2 receives control signal A through the resistor R1. This control signal A when supplied to the base of transistor Q2 causes transistor Q2 to generate an output signal which can be used for modulating the operation of the electronically controlled expansion valve 6. When the base of transistor Q2 is grounded, however, no output control signal is supplied to the electronically controlled expansion valve and hence the expansion valve is prevented from operating during a defrost cycle of operation.

The present invention may be embodied in other specific forms without departing from the spirit or essential characteristics thereof. The present embodiments are presented merely as illustrative and not restrictive, with the scope of the invention being indicated by the attached claims rather than the foregoing description. All changes which come within the meaning and range of equivalency of the claims are therefore intended to be embraced therein.

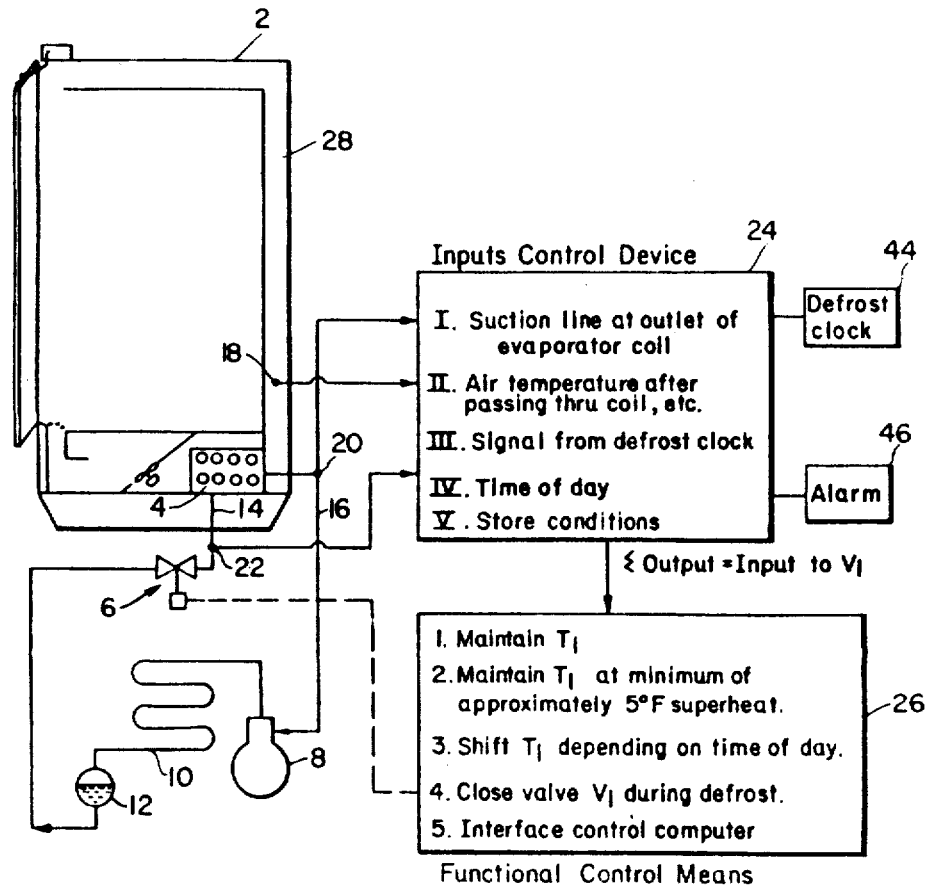

What is claimed is:

1. A refrigeration control system for a refrigeration system including a refrigerated display case with a primary air conduit having an air outlet opening and an air inlet opening, an evaporator coil arranged within the primary air conduit for refrigerating air passing through such conduit, and an expansion valve coupled to the inlet end of the evaporator coil, said refrigeration control system comprising:

a pressure sensing means arranged at the refrigerant discharge line from the evaporator coil for sensing the pressure (P) of the refrigerant within such discharge line;

means for determining the saturation temperature ($T_{sat}$) of the refrigerant from the measurement of pressure P;

means for setting a level of superheat ($T_{sh}$) desired within the refrigerant discharged from the evaporator coil and setting a desired temperature ($T_{2set}$) for such discharge refrigerant by $$T_{2set} = T_{sat} + T_s;$$

a second temperature sensing means arranged adjacent to the refrigerant discharge line from the evaporator coil for measuring the temperature ($T_2$) of the refrigerant discharged from the evaporator coil;

comparator means for comparing temperature $T_2$ with temperature $T_{2set}$ and providing an output comparison signal if $T_2 < T_{2set}$; and, control means receiving the output comparison signal and providing an output control signal for controlling operation of the refrigeration system for maintaining temperature $T_2$ equal to or above temperature $T_{2set}$.

2. A refrigeration control system according to claim 1 wherein said means for determining the saturation temperature $T_{sat}$ from pressure P uses the following relationships For refrigerant R-502    Temperature Range −50 to 0° F.
$T_{sat} = 0.00053204591P^3 - 0.07027440492P^2 +$
$\qquad 4.2630221429P - 98.92133288$ Temperature Range 0° F. to 50° F.
$T_{sat} = 0.000031298402P^3 - 0.01112645218P^2 +$
$\qquad 1.8907849084P - 66.2388444$ -continued

| For refrigerant R-12 | Temperature Range −10 to +50° F. |
|---|---|
| $T = 0.00025752709P^3 - 0.04544987P^2 + 3.7152263P - 66.375648$ | |
| For refrigerant R-22 | Temperature Range −10 to +50° F. |
| $T = 0.00006161138P^3 - 0.017536207P^2 + 2.3158884P - 67.003218$ | |

3. A refrigeration control system according to claim 1 wherein temperature $T_{sh}$ is set to be a minimum of approximately 5° F.

4. A refrigeration control system according to claim 1 further comprising third temperature sensing means arranged adjacent the inlet end of the evaporator coil for sensing the temperature ($T_3$) of the refrigerant flowing into the evaporator coil and wherein said control means provides an output control signal for controlling operation of the refrigeration system for maintaining temperature $T_2$ greater than temperature $T_3$.

5. A refrigeration control system according to claim 4 wherein said control means provides an output signal for controlling the operation of the refrigeration system for maintaining temperature $T_2$ greater than temperature $T_3$ by an amount sufficient to insure that all of the liquid refrigerant passing through the evaporator coil is completely transformed into a gaseous refrigerant by the time that it is discharged from the evaporator coil.

6. A refrigeration control system for a refrigeration system including a refrigerated display case with a primary air conduit having an air outlet opening and an air inlet opening, an evaporator coil arranged within the primary air conduit for refrigerating air passing through such conduit, and an expansion valve coupled to the inlet end of the evaporator coil, said refrigeration control system comprising:
   first temperature sensing means arranged at the air discharge side of the evaporator coil for sensing the temperature ($T_1$) of the air that has passed over the evaporator coil;
   a second temperature sensing means arranged adjacent to the refrigerant discharge end of the evaporator coil for measuring the temperature ($T_2$) of the refrigerant discharged from the evaporator coil;
   comparator means for comparing temperature $T_1$ with temperature $T_2$ to determine if temperature $T_1$ is greater than temperature $T_2$ by a preselected temperature differential;
   means for setting a desired temperature differential between temperature $T_1$ and temperature $T_2$ for maintaining temperature $T_1$ sufficiently above temperature $T_2$ to assure that the refrigerant discharged from the evaporator coil is above its saturation temperature; and,
   control means to provide an output control signal for controlling operation of the refrigeration system for maintaining temperature $T_1$ sufficiently above temperature $T_2$ by at least the set temperature differential.

7. A refrigeration control system according to claim 6 further comprising third temperature sensing means arranged adjacent the inlet end of the evaporator coil for sensing the temperature ($T_3$) of the refrigerant flowing into the evaporator coil and wherein said control means provides an output control signal for controlling operation of the refrigeration system for maintaining temperature $T_2$ greater than temperature $T_3$.

8. A refrigeration control system according to claim 7 wherein said control means provides an output signal for controlling the operation of the refrigeration system for maintaining temperature $T_2$ greater than temperature $T_3$ by an amount sufficient to insure that all of the liquid refrigerant passing through the evaporator coil is completely transformed into a gaseous refrigerant by the time that it is discharged from the evaporator coil.

9. A refrigeration control system according to claim 6 wherein temperature $T_1$ is maintained a minimum of 4° to 6° F. above temperature $T_2$ for freezer display cases.

10. A refrigeration control system according to claim 6 wherein temperature $T_1$ is maintained a minimum of 5° to 8° F. above temperature $T_2$ for medium temperature display cases.

11. A refrigeration control system according to claim 6 wherein temperature $T_1$ is maintained a minimum of approximately 5° F. above temperature $T_2$.

12. A refrigeration control system according to claim 11 further comprising an electronically controlled expansion valve and wherein said control means provides an output signal for closing said expansion valve if $(T_1 - T_2) < 5°$ for longer than a preselected time period.

13. A refrigeration control system according to claim 6 wherein said first temperature sensing means for measuring the air discharge temperature ($T_1$) is arranged in the primary air conduit of the refrigerated display case at a location downstream of the evaporator coil.

14. A refrigeration control system according to claim 6 further comprising an electronically controlled expansion valve, means for setting a desired temperature ($T_{1set}$) for the air discharge temperature, and further comparator means for comparing temperature $T_1$ with temperature $T_{1set}$; and wherein said control means is coupled to the output of said further comparator means and provides an output signal for opening the expansion valve if $(T_1 - T_{1set}) > 1°$ F. and an output signal for closing the expansion valve if $(T_1 - T_{1set}) < 1°$ F.

15. A refrigeration control system according to claim 6 further comprising means for setting an alarm temperature ($T_A$) and wherein said control means provides an alarm signal if $T_1 > T_A$ for longer than a set period of time.

16. A refrigeration system comprising:
   a refrigerated display case with a primary air conduit having an air outlet opening and an air inlet opening;
   an evaporator coil arranged within said primary air conduit for refrigerating air passing through said primary air conduit;
   an electronically controlled expansion valve coupled to the inlet end of said evaporator coil; and,
   a refrigeration control system including: first temperature sensing means arranged at the air discharge side of said evaporator coil for sensing the temperature ($T_1$) of the air that has passed over said evaporator coil; a second temperature sensing means arranged adjacent to the refrigerant discharge end of said evaporator coil for measuring the temperature ($T_2$) of the refrigerant discharged from said evaporator coil; comparator means for comparing temperature $T_1$ with temperature $T_2$ to determine if temperature $T_1$ is greater than temperature $T_2$ by a preselected temperature differential; means for setting a desired temperature differential between temperature $T_1$ and temperature $T_2$ for maintaining temperature $T_1$ sufficiently above temperature $T_2$ to assure that the refrigerant discharged from said evaporator coil is above its saturation temperature; and, control means to provide an output control signal to said electronically controlled expansion valve for controlling operation of the refrigeration system for maintaining temperature $T_1$ sufficiently above temperature $T_2$ by at least the set temperature differential.

17. A refrigeration system according to claim 16 further comprising third temperature sensing means arranged adjacent said inlet end of said evaporator coil for sensing the temperature ($T_3$) of the refrigerant flowing into said evaporator coil and wherein said control means provides an output control signal for controlling operation of the refrigeration system for maintaining temperature $T_2$ greater than temperature $T_3$.

18. A refrigeration system according to claim 17 wherein said control means provides an output signal for controlling the operation of said electronically controlled expansion valve for maintaining temperature $T_2$ greater than temperature $T_3$ by an amount sufficient to insure that all of the liquid refrigerant passing through said evaporator coil is completely transformed into a gaseous refrigerant by the time that it is discharged from said evaporator coil.

19. A refrigeration system according to claim 16 wherein temperature $T_1$ is maintained a minimum of 4° to 6° F. above temperature $T_2$ for freezer display cases.

20. A refrigeration system according to claim 16 wherein temperature $T_1$ is maintained a minimum of 5° to 8° F. above temperature $T_2$ for medium temperature display cases.

21. A refrigeration system according to claim 16 wherein temperature $T_1$ is maintained a minimum of approximately 5° F. above temperature $T_2$.

22. A refrigeration system according to claim 21 wherein said control means provides an output signal for closing said expansion valve if $(T_1-T_2)<5°$ F. for longer than a preselected time period.

23. A refrigeration system according to claim 16 wherein said first temperature sensing means for measuring the air discharge temperature ($T_1$) is arranged in said primary air conduit of said refrigerated display case at a location downstream of the evaporator coil.

24. A refrigeration system according to claim 16 further comprising means for setting a desired temperature ($T_{1set}$) for the air discharge temperature and further comparator means for comparing temperature $T_1$ with temperature $T_{1set}$; and wherein said control means is coupled to the output of said further comparator means and provides an output signal for opening said expansion valve if $(T_1-T_{1set})>1°$ F. and an output signal for closing said expansion valve if $(T_1-T_{1set})<1°$ F.

25. A refrigeration system according to claim 16 further comprising means for setting an alarm temperature ($T_A$) and wherein said control means provides an alarm signal if $T_1<T_A$ for longer than a set period of time.

26. A refrigeration control system for a refrigeration system including a refrigerated display case with a primary air conduit having an air outlet opening and an air inlet opening, an evaporator coil arranged within the primary air conduit for refrigerating air passing through such conduit, and an expansion valve coupled the inlet end of the evaporator coil, said refrigeration control system comprising:
a discharge temperature sensing means arranged adjacent to the refrigerant discharge end of the evaporator coil for measuring the temperature ($T_2$) of the refrigerant discharged from the evaporator coil;
an inlet temperature sensing means arranged adjacent the inlet end of the evaporator coil for sensing the temperature ($T_3$) of the refrigerant flowing into the evaporator coil;
comparator means for comparing temperature $T_2$ with temperature $T_3$ to determine if temperature $T_2$ is greater than temperature $T_3$ by a preselected temperature differential;
means for setting a desired temperature differential between temperature $T_2$ and temperature $T_3$ for maintaining temperature $T_2$ sufficiently above temperature $T_3$ to assure that the refrigerant discharged from the evaporator coil is superheated; and,
control means to provide an output control signal for controlling operation of the refrigeration system for maintaining temperature $T_2$ sufficiently above temperature $T_3$ by at least the set temperature differential.

27. A refrigeration control system according to claim 26 wherein said control means provides an output signal for controlling the operation of the refrigeration system for maintaining temperature $T_2$ greater than temperature $T_3$ by an amount sufficient to insure that all of the liquid refrigerant passing through the evaporator coil is completely transformed into a gaseous refrigerant by the time that it is discharged from the evaporator coil.

28. A refrigeration control system according to claim 27 wherein temperature $T_2$ is maintained a minimum of approximately 4° to 10° F. above temperature $T_3$.

29. A refrigeration control system according to claim 28 further comprising an electronically controlled expansion valve, an air temperature sensing means arranged at the air discharge side of the evaporator coil for sensing the temperature ($T_1$) of the air that has passed over the evaporator coil and wherein said control means provides an output signal for closing said expansion valve if $(T_1-T_2)>5°$ F. for longer than a preselected time period.

30. A refrigeration control system according to claim 29 wherein said first temperature sensing means for measuring the air discharge temperature ($T_1$) is arranged in the primary air conduit of the refrigerated display case.

31. A refrigeration control system according to claim 30 further comprising means for setting a desired temperature ($T_{1set}$) for the air discharge temperature and further comparator means for comparing temperature $T_1$ with temperature $T_{1set}$; and wherein said control means is coupled to the output of said further comparator means and provides an output signal for opening the expansion valve if $(T_1-T_{1set})>1°$ F. and an output signal for closing the expansion valve if $(T_1-T_{1set})<1°$ F.

32. A refrigeration system comprising:
a refrigerated display case with a primary air conduit having an air outlet and an air inlet opening;
an evaporator coil arranged within said primary air conduit for refrigerating air passing through said primary air conduit;
an electronically controlled expansion valve coupled to the inlet end of said evaporator coil; and
a refrigeration system including: a pressure sensing means arranged at the refrigerant discharge line from said evaporator coil for sensing the pressure (P) of the refrigerant within said discharge line; means for determining the saturation temperature ($T_{sat}$) of the refrigerant from the measuring of pressure P; means for setting a level of superheat ($T_{sh}$) desired within the refrigerant discharged from said evaporator coil and setting a desired temperature ($T_{2set}$) for such discharge refrigerant by $T_{2set}=T_{sat}+T_s$; a second temperature sensing means arranged adjacent to said refrigerant discharge line from said evaporator coil for measuring the temperature ($T_2$) of the refrigerant discharged from said evaporator coil; comparator means for comparing temperature $T_2$ with temperature $T_{2set}$ and providing an output comparison signal if $T_2>T_{2set}$; and, control means receiving the output comparison signal and providing an output control signal for controlling operation of the refrigeration system for maintaining temperature $T_2$ equal to or above temperature $T_{2set}$.

33. A refrigeration system according to claim 32 wherein said means for determining the saturation temperature ($T_{sat}$) from pressure (P) uses the following relationships

---

For refrigerant R-502  Temperature Range −50 to 0° F.
$T_{sat} = 0.00053204591P^3 - 0.07027440492P^2 + 4.2630221429P - 98.92133288$
Temperature Range 0° F. to 50° F.
$T_{sat} = 0.000031298402P^3 - 0.01112645218P^2 + 1.8907849084P - 66.2388444$
For refrigerant R-12  Temperature Range −10 to +50° F.
$T = 0.00025752709P^3 - 0.04544987P^2 + 3.7152263P - 66.375648$
For refrigerant R-22  Temperature Range −10 to +50° F.
$T = 0.00006161138P^3 - 0.017536207P^2 + 2.3158884P - 67.003218$

---

34. A refrigeration system according to claim 32 wherein temperature $T_{sh}$ is set to be a minimum of approximately 5° F.

35. A refrigeration system according to claim 32 further comprising third temperature sensing means arranged adjacent the inlet end of said evaporator coil for sensing the temperature ($T_3$) of the refrigerant flowing into said evaporator coil and wherein said control means provides an output control signal for controlling operation of the refrigeration system for maintaining temperature $T_2$ greater than temperature $T_3$.

36. A refrigeration system according to claim 35 wherein said control means provides an output signal for controlling the operation of the refrigeration system for maintaining temperature $T_2$ greater than temperature $T_3$ by an amount sufficient to insure that all of the liquid refrigerant passing through the evaporator coil is completely transformed into a gaseous refrigerant by the time that it is discharged from said evaporator coil.

* * * * *

UNITED STATES PATENT AND TRADEMARK OFFICE
CERTIFICATE OF CORRECTION

PATENT NO. : 4,478,051

DATED : October 23, 1984

INVENTOR(S) : Ibrahim

It is certified that error appears in the above-identified patent and that said Letters Patent is hereby corrected as shown below:

The title page should be deleted to appear as per attached title page.

The sheets of Drawings should be deleted to appear as per attached sheets.

Signed and Sealed this

Seventeenth Day of September 1985

[SEAL]

*Attest:*

*Attesting Officer*

DONALD J. QUIGG

*Commissioner of Patents and Trademarks—Designate*

ELECTRONIC TEMPERATURE CONTROL SYSTEM

[75] Inventor: Fayez F. Ibrahim, Niles, Mich.

[73] Assignee: Tyler Refrigeration Corporation, Niles, Mich.

[21] Appl. No.: 492,486

[22] Filed: May 6, 1983

[51] Int. Cl.³ .................... F25B 41/00; G05D 23/00
[52] U.S. Cl. ............................... 62/212; 62/211; 165/39; 236/91 F
[58] Field of Search ............ 62/211, 212, 223, 225; 236/91 F; 165/39

[56] References Cited

U.S. PATENT DOCUMENTS

| | | | |
|---|---|---|---|
| 2,579,034 | 12/1951 | Dube et al. | 62/211 |
| 3,577,743 | 5/1971 | Long | 62/204 |
| 3,803,865 | 4/1974 | Newton | 62/225 X |
| 4,067,203 | 1/1978 | Behr | 62/208 |
| 4,283,921 | 8/1981 | Prosky | 62/223 X |

Primary Examiner—William E. Wayner
Assistant Examiner—J. Sollecito
Attorney, Agent, or Firm—LeBlanc, Nolan, Shur & Nies

[57] ABSTRACT

A refrigeration system including a refrigeration control system for controlling the operation of the refrigeration system so as to insure that the temperature of the refrigerant discharged from the evaporator coil is above the saturation temperature. The refrigeration system includes at least one refrigerated display case having an evaporator within the primary air conduit and an expansion valve coupled to the inlet end of the evaporator coil. The control system includes: a pressure sensor arranged within the refrigerant discharge line, i.e. suction line to compressor, from the evaporator coil; a first temperature sensor arranged at the air discharge side of the evaporator coil for sensing the temperature ($T_1$) of the air that has passed over the evaporator coil, a second temperature sensor arranged adjacent to the refrigerant discharge end of the evaporator coil for measuring the temperature ($T_2$) of the refrigerant discharged from the evaporator coil and a third temperature sensor arranged adjacent the inlet end of the evaporator coil for sensing the temperature ($T_3$) of the refrigerant flowing into the evaporator coil. Based upon a comparison of temperatures $T_1$, $T_2$ and $T_3$ a series of output control signals are provided for controlling the operation of the expansion valve.

36 Claims, 6 Drawing Figures